United States Patent Office 3,265,849
Patented August 9, 1966

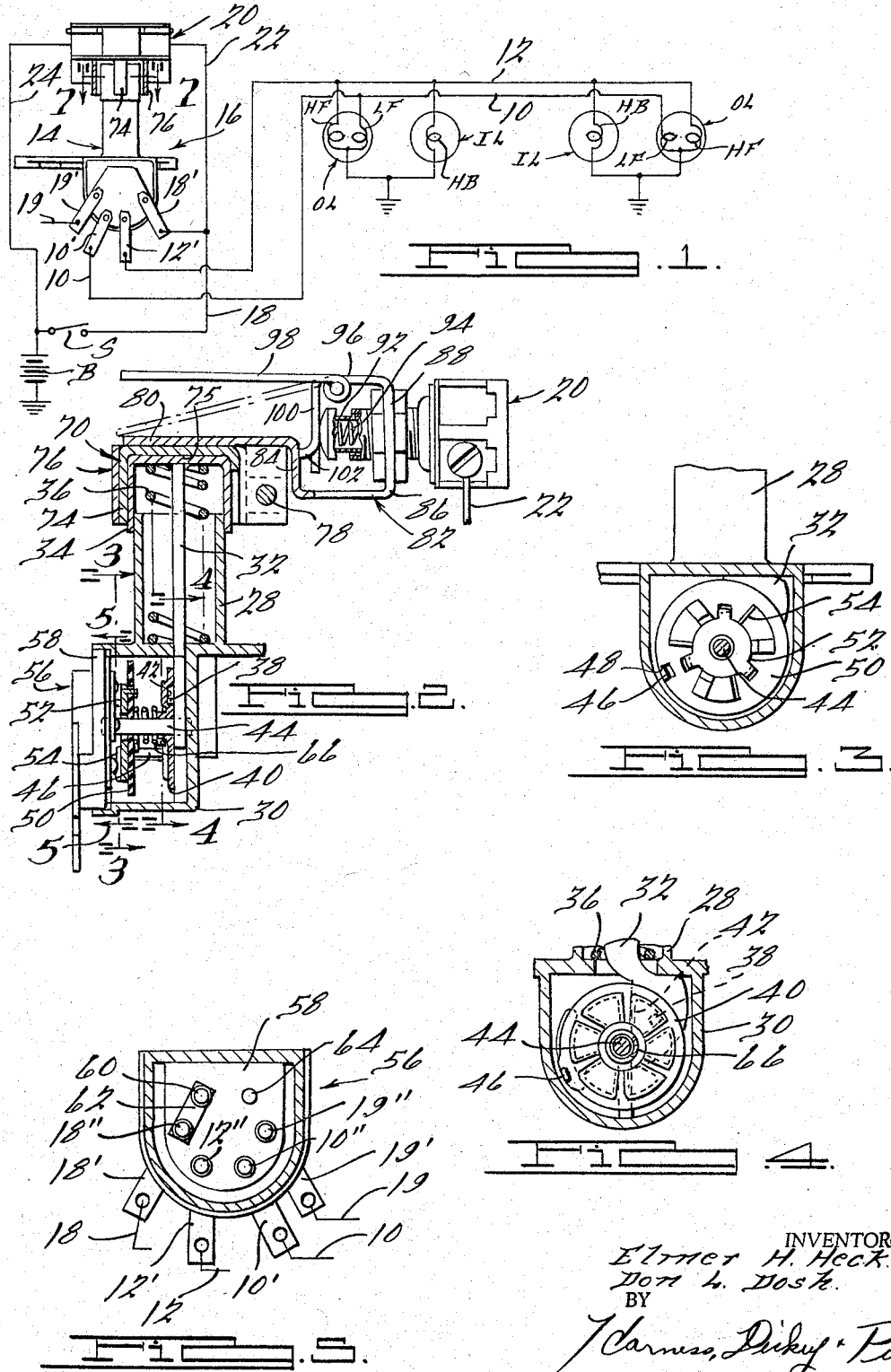

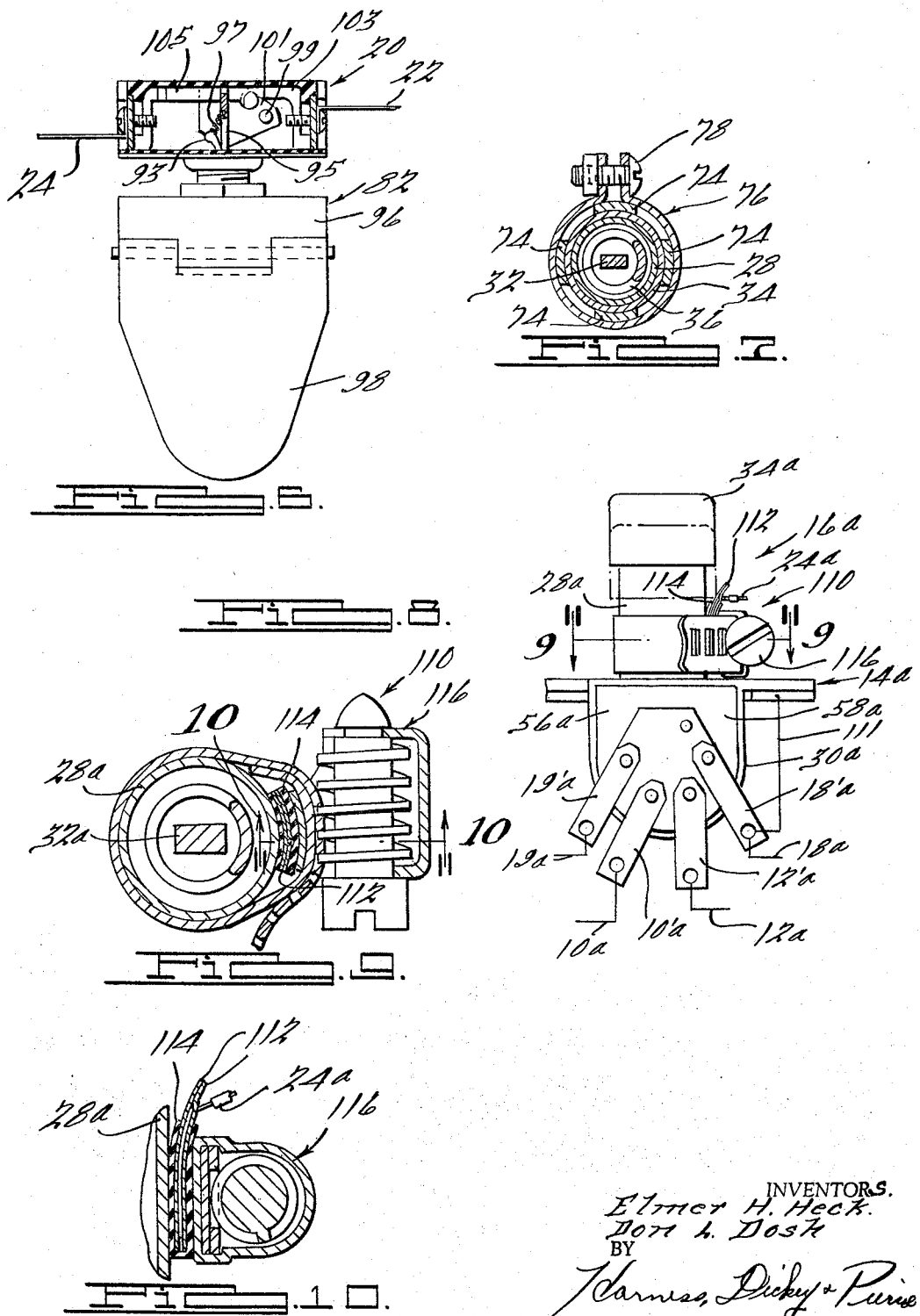

3,265,849
COMBINATION DIMMER SWITCH AND HEADLIGHT FLASHING APPARATUS
Elmer H. Heck and Don L. Dosh, Flint, Mich., assignors to D & H Devices, a partnership
Filed Nov. 19, 1963, Ser. No. 324,772
13 Claims. (Cl. 200—172)

This invention relates to a headlight flashing system for an automotive vehicle and more particularly to a headlight flashing system operative cooperatively with a dimmer switch for an automotive vehicle.

Often during daylight driving it is desirable to be able to signal an oncoming vehicle. Truck drivers currently flash the headlights of their trucks during daylight in order to warn oncoming vehicles of dangerous conditions, etc. which may be ahead. The present invention provides a safe, convenient system whereby the lights of the vehicle can be flashed on and off by the driver. Therefore, it is an object of this invention to provide a system operable by the operator of a vehicle for flashing the lights of the vehicle on and off.

Currently the lights can be flashed on and off only by means of the headlight switch. This is awkward since the driver is usually not familiar enough with the location of the light switch such that it can be reached without groping, fumbling, etc. This can also be dangerous since the driver must remove one hand from the steering wheel and also may take his eyes from the road to facilitate locating the light switch. In the present invention these disadvantages are eliminated and a system is provided whereby the lights can be actuated in conjunction with the dimmer switch. The dimmer switch of a vehicle is located in a position familiar to the driver and is readily located and operated through the conditioned reflex of his left foot. Therefore it is an object of this invention to provide an electrical system for flashing the light of an automotive vehicle which is operative cooperatively with the dimmer switch of the vehicle.

The present invention utilizes a combination dimmer and light signal switch assembly which is in the location usually occupied by the dimmer switch alone; this simplifies the installation and wiring of the combination switch. Therefore, it is another object of this invention to provide a combination dimmer and light switch which can easily be mounted and wired.

Other objects, features, and advantages of the present invention will become apparent from the subsequent description, taken in conjunction with the accompanying drawings, wherein:

FIGURE 1 is a schematic diagram of an electrical circuit for the headlights for an automotive vehicle shown connected to a combination dimmer and light signal switch assembly embodying features of the present invention and shown in elevation;

FIGURE 2 is a side elevational sectional view of the combination dimmer and light signal switch assembly shown in FIGURE 1;

FIGURE 3 is a sectional view of the switch assembly of FIGURE 2 taken substantially along the line 3—3;

FIGURE 4 is a sectional view of the switch assembly of FIGURE 2 taken substantially along the line 4—4;

FIGURE 5 is a sectional view of the switch assembly of FIGURE 2 taken substantially along the line 5—5 in FIGURE 2; and FIGURE 6 is a plan view, with some parts shown in section, of the combination dimmer and light signal switch assembly of FIGURE 2;

FIGURE 7 is a cross-sectional view of the combination dimmer and light signal switch assembly of FIGURES 1 and 2 taken along the line 7—7 in FIGURE 1;

FIGURE 8 is a front elevational view of a modified form of a combination dimmer and light signal switch assembly;

FIGURE 9 is a cross-sectional view to enlarged scale of the modified combination dimmer and light signal switch of FIGURE 8 taken along the line 9—9; and FIGURE 10 is a cross-sectional view of the view of FIGURE 9 taken along the line 10—10.

Looking now to FIGURE 1, a dual headlight system is shown and includes a pair of outboard lights OL each having a low beam filament LF connected between ground and a conductor 10 and a high beam filament HF connected between ground and a conductor 12. The system also includes a pair of inboard lights IL each having a high beam filament HB connected between ground and the conductor 12. The conductors 10 and 12 are connected to terminals 10' and 12', respectively of a dimmer switch 14 of a combination dimmer and light signal switch assembly 16. A conductor 18 is connected between a terminal 18' on dimmer switch 14 and the positive side of a negatively grounded battery B via a light switch S which can be of a conventional construction and which is located at the dash of the vehicle.

The dimmer switch 14 can be of a conventional construction whereby with light switch S closed, it is actuable to successively connect terminal 18' to terminal 10' thereby energizing low beam filament LF via conductor 10 and to connect terminal 18' to terminal 12' thereby energizing high beam filaments HF and HB via conductor 12. A conductor 19 is connected to a high beam signal light (not shown) located at the dash of the vehicle and to a terminal 19' on the dimmer switch 14 and is energized when the high beam filaments HF and HB are energized to signal the driver that his lights are on high beam. A light signal switch 20 is connected in parallel with the light switch S via conductors 22 and 24. The signal switch 20 is normally opened and hence does not affect the lighting circuit until actuated in a manner to be described.

The dimmer switch 14 has a one piece housing which includes a tubular portion 28 opened at the top and connected to an enlarged body portion 30 which is opened at the front. A flat elongated arm 32 extends from the tubular portion 28 and into the body portion 30. A cap 34, movable axially over the top of the tubular portion 28, is connected to the top of the arm 32. A spring 36, located within tubular portion 28 about the arm 32, engages the cap 34 and is normally compressively preloaded to urge the arm 32 upwardly. The lower portion of the flat arm 32 located within the body portion 30 has a projection 38 which extends outwardly for engagement with a circular drive member 40 having a plurality of circumferentially disposed cam pockets 42 formed in its face. Looking now to FIGURES 2–4, the drive member 40 is rotatably mounted upon a shaft 44 which has one end secured within the body portion 30 and extends towards its forward opening. In a manner to be described, the projection 38 engages the drive member 40 at successive ones of the pockets 42 responsively to up and down movement of the arm 32 to cause rotation of the drive member 40 to a number of positions corresponding to the number of pockets 42.

The drive member 40 has an axially outwardly extending tab 46 which is engageable within a slot 48 (FIGURES 2 and 3) of a circular carrier member 50 which is made of a suitable electrical insulating material and which is also rotatably mounted upon the shaft 44. A contact disc 52, made of a material which is a good conductor of electricity, is mounted upon the forward face of the carrier member 50 and has a plurality of circumferentially spaced radially, outwardly extending blades 54 each having a cam surface formed therein. Thus, as the arm 32 is reciprocated moving the drive member 40 to successive radial positions, via engagement of projection 38 with cam pockets 42, the carrier member 50, and hence contact disc 52, is similarly moved or indexed via the engagement of the tab 46 in slot 48.

Looking now to FIGURES 2 and 5, a terminal assembly 56 has a plastic mounting member 58 located matably in and closes the forward end of the body portion 30. A plurality of rivet-like members 10″, 12″, 18″ and 19″ extend through the mounting member 58 and secure the terminals 10′, 12′, 18′ and 19′, respectively, to the outer surface of the mounting member 58. The rivets are made of material which is a good conductor of electricity and are formed with rounded heads on their inner ends which are engageable with the cam pockets 54 of the contact disc 52. An additional rivet 60 is located near and is electrically connected to rivet 18″ by means of a strap 62 and serves a purpose to be readily seen. The plastic mounting member 58 has formed integrally therewith a head 64 simulating the rivet heads. The rivet heads and head 64 are circumferentially disposed and equiangularly spaced. The contact disc 52 has three blades 54 which are equiangularly spaced to contact alternate ones of the heads. The drive member 40 is provided with a number of the cam pockets 42 equal to the number of heads such that each time the arm 32 is actuated the drive member 40, and hence carrier member 50, is rotated through an angle equal to that between heads whereby alternate ones of the heads are successively, electrically connected via the contact disc 52. Thus upon a first actuation heads 18″, 10″ and 64 are contacted by the blades 54 of disc 52 thereby closing a circuit from conductor 18 to conductor 10, where, with switch S closed, the low beam filaments LF are energized. Upon the next actuation heads 60, 12″ and 19″ are contacted by the blades 54 of disc 52 thereby closing a circuit from conductor 18 to conductors 12 and 19 where, with switch S closed, the high beam filaments HF and HB and the high beam indicating light are energized.

A coil spring member 66 is located on the shaft 44 under a compressive preload between drive member 40 and carrier member 50. Thus the drive member 40 is resiliently urged against the flat arm 32 and insures positive engagement of the pockets 42 with projection 38. The spring 66 does permit the drive member 40 to move axially whereby after indexing the drive member 40 to a succeeding position by downward movement of the arm 32, upon upward, return movement of the arm 32 the projection 38 can move to the next pocket 42 by first moving the drive member axially outwardly. The spring 66 operates similarly relative to the carrier member 50 and contact disc 52.

Thus by successively actuating the arm 32 the lights OL and IL can be switched between high and low beam conditions.

The mechanism for actuating the light signal switch 20 includes a cap assembly 70 with a plurality of circumferentially disposed, angularly spaced fingers 74 which extend axially from a flat circular portion 75 and which are located to extend down over the cap 34 (see FIGURE 7). A metal strap clamp 76 is located annularly about the fingers 74 and can be tightened via a nut and bolt assembly 78 whereby the fingers 74 are moved together into engagement with the cap 34. The circular portion 75, and hence the cap assembly 70, is fixed to a flat plate portion 80 of a mounting bracket 82. The flat plate portion 80 extends transversely to the tubular portion 28 of the dimmer switch 14 and is connected to a short downwardly extending leg 84 of a U-shaped portion 86 which has a long leg 88 on which is mounted the switch 20. The switch 20 is a single pole, single throw switch and can be of a conventional construction the specific details of which do not constitute a part of the present invention. The switch 20 is actuable by means of a movable plunger member 92 which, when depressed, closes the circuit of switch 20, and hence the circuit between conductors 22 and 24. Briefly, the plunger member 92 is connected with a toggle member 93 (see FIGURE 6) and pivots the toggle member 93 in one direction as it is depressed. The toggle member 93 is connected centrally to a pivotally supported, bifurcated pivot arm 95 by means of a spring 97. A contact button 99 is mounted on an insulating board 101 which in turn is secured to the pivot arm 95. Thus as the toggle member 93 pivots in one direction the pivot arm 95 and board 101 are pivoted moving the contact button 99 into electrical contact between a pair of normally separated conductors 103 and 105. The conductors 103 and 105 are connected to conductors 22 and 24, respectively; thus when plunger member 92 is depressed a circuit is closed between conductors 22 and 24. The plunger member 92 is biased by a spring 94 to an outer position at which the switch 20 is normally opened. Unless the plunger member 92 is held in, the spring 94 will automatically move outwardly opening the circuit. Since the switch 20 parallels the light switch S, the lights OL and IL can be turned "on" by closing switch 20 and can be turned "off" by opening switch 20. A hinge support portion 96 extends transversely from the long leg 88 in a direction towards the tubular portion 28 and has a flat actuating lever 98 hinged at its terminating end. The lever 98 extends transversely over the tubular portion 28 and has a downwardly extending leg portion 100 which engages the plunger member 92 such that pivotal movement of the lever 98 towards the tubular portion 28 causes the plunger member 92 to be depressed via the leg portion 100 thereby closing the circuit of switch 20. The bias of spring 94 urges the lever 98 upwardly to a position spaced from the plate portion 80 and from the tubular portion 28. The leg portion 100 has finger portions 102 which engage the short leg 84 and limit the upward movement of the lever 98 whereby the lever 98 normally extends transversely relative to the tubular portion 28 and is spaced above it. Thus by pivoting the lever 98 downwardly the switch 20 is closed thereby energizing at least some of the filaments of lights OL and IL depending upon the condition of the dimmer switch 14. Note that the lever 98 is located just above the tubular portion 28 whereby the switch 20 is actuated by a force acting substantially in the same direction as the force required to actuate the dimmer switch 14. Thus the operator can actuate the signal switch 20 with the same familiar motion to which he is accustomed in operating the dimmer switch 14.

The length of the lever arm 98 and the effort required to actuate switch 20 including the spring rate of the spring 94 are selected relative to the effort required to actuate the dimmer switch 14 such that the light signal switch 20 can be actuated with less effort than is required to actuate the dimmer switch 14. Thus, if desired, the operator can actuate the light signal switch 20 without actuating the dimmer switch 14. Of course, when the light switch S is closed the dimmer switch 14 is actuated in the conventional manner and the closing and opening of switch 20 does not effect the operation of the dimmer switch 14 or the condition of the lights OL and IL. With the combination described above, the lights OL and IL can be actuated to signal oncoming drivers without the necessity of the driver removing his hands from the wheel or taking his eyes from the road and by means located in a position to which the driver's reflexes have become accustomed.

In the embodiment shown in FIGURES 1–7 and described above a separate switch is shown in combination with the dimmer switch. In the embodiment shown in FIGURES 8–10 the light signal switch is integral with the dimmer switch and components serving similar functions as like components in the embodiment of FIGURES 1–7 have been given the same number with the subscript "a".

The dimmer switch 14a has its housing electrically connected to the terminal 18'a, as by a conductor 111, and hence is electrically connected to conductor 18a. Thus the conductor 111 and the housing of the dimmer switch 14a of FIGURES 8–10 take the place of the conductor 22 in the circuit of FIGURE 1; the remainder of the conductors 18a, 12a, 16a, and 19a of FIGURES 8–10 are connected as their similarly numbered counterparts of FIGURE 1. A terminal assembly 110 is made up of a pair of resilient metal strips 112 which are held together within an outer insulating layer 114. The assembly 110 includes and is held to the bottom of the tubular portion 28a by a strap clamp assembly 116 which can be of a type well known in the art. The conductor 24a is clamped between the strips 112 which are normally maintained out of electrical contact with the housing of the dimmer switch 14a via the insulating layer 114. The dimmer switch housing and strips 112 are made of materials which readily conduct electricity and hence provide a light signal switch paralleling the light switch, such as light switch S of FIGURE 1. As the cap 34a, which is of a larger diameter than tubular portion 28a, is depressed, it engages one of the strips 112 closing a circuit between strips 112, and hence conductor 24a, and the dimmer switch housing, and hence conductor 18a, thereby closing the circuit to the lights of the vehicle. Of course, when the cap 34a is released it moves upwardly opening the circuit of the light signal switch. Since the dimmer switch housing is used as part of the circuit, it would be isolated from the body ground of the vehicle.

With both embodiments the light signal switch is associated with the dimmer switch such that both are actuated by forces acting along a common line which in the embodiments shown is the axis of reciprocation of the arm 32, 32a. Also note that the actuating mechanisms for the dimmer switch and light signal switch are cooperatively connected and hence can be considered together as a common actuating mechanism assembly for both switches. For example, in the first embodiment of FIGURES 1–7, the dimmer switch mechanism is actuated through the light signal switch mechanism; in the second embodiment of FIGURES 8–10, considering the cap 34a as a part of the light signal switch, the light signal switch is actuated through the dimmer switch mechanism. In both embodiments the headlights of the vehicle can be flashed to signal oncoming drivers by means located in a position with which the driver is familiar and which can be actuated safely and quickly. Also in both embodiments, since the combination switch is mounted in the location normally occupied by the dimmer switch alone, installation and wiring are simplified.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a lighting system for an automotive vehicle including headlights having high and low beam lighting conditions, the improvement comprising: dimmer switch means actuable for switching the headlights of the vehicle between high and low beam lighting conditions, signal switch means actuable for turning at least one of the headlights on and off, and actuating mechanism assembly means common to both of said switch means and selectively actuable for actuating both of said switch means and including a movable actuating member common to both said switch means and movable for actuating both said switch means.

2. In a lighting system for an automotive vehicle including headlights having high and low beam lighting conditions and being energizable by a source of electrical potential, the improvement comprising: dimmer switch means actuable for switching the headlights of the vehicle between high and low beam lighting conditions, electrical circuit means connecting said dimmer switch means to the headlights, signal switch means actuable for connecting and disconnecting said dimmer switch means and the source, and actuating mechanism assembly means common to both of said switch means and selectively actuable for actuating both of said switch means and including a movable actuating member common to both said switch means and movable for actuating both said switch means.

3. In a lighting system for an automotive vehicle including: headlights having high and low beam lighting conditions, the improvement comprising: dimmer switch means actuable for switching the headlights of the vehicle between high and low beam lighting conditions, a first switch mechanism selectively actuable for actuating said dimmer switch means responsively to a force along a selected axis, signal switch means actuable for turning the headlights on and off, and a second switch mechanism connected with said first switch mechanism and being selectively actuable for actuating said signal switch means responsively to a force along said selected axis.

4. In a lighting system for an automotive vehicle including headlights having high and low beam lighting conditions, the improvement comprising: dimmer switch means actuable for switching the headlights of the vehicle between high and low beam lighting conditions, signal switch means actuable for turning at least one of the headlights on and off, first actuating mechanism means including a member reciprocable along a selected axis and actuable for actuating said dimmer switch means responsively to reciprocation of said reciprocable member, and second actuating mechanism means operatively connected to said first actuating mechanism means and actuable by a force along said selected axis for actuating said signal switch means.

5. In a lighting system for an automotive vehicle including headlights having high and low beam lighting conditions, the improvement comprising: dimmer switch means actuable for switching the headlights of the vehicle between high and low beam lighting conditions, signal switch means actuable for turning at least one of the headlights on and off, first actuating mechanism means including a member movable along a selected path and actuable for actuating said dimmer switch means responsively to movement of said member along said path, and second actuating mechanism means operatively connected to said first actuating mechanism means and actuable responsively to movement of said member along said path.

6. In a lighting system for an automotive vehicle including headlights having high and low beam lighting conditions, the improvement comprising: dimmer switch means actuable for switching the headlights of the vehicle between high and low beam lighting conditions, signal switch means actuable for turning at least one of the headlights on and off, first actuating mechanism means including a member movable along a selected path actuable for actuating said dimmer switch means responsively to movement of said member along said path, and second actuating mechanism means connected to said member and actuable by a force generally along said selected path for actuating said signal switch means.

7. In a lighting system for an automotive vehicle including headlights having high and low beam lighting conditions, the improvement comprising: dimmer switch means actuable for switching the headlights of the vehicle between high and low beam lighting conditions, signal switch means actuable for turning at least one of the headlights on and off, first actuating mechanism means including a member movable along a selected path actuable for actuating said dimmer switch means responsively to movement of said member along said path, and second actuating mechanism means connected to said member and actuable by a force generally along said selected path for actuating said signal switch means, said second actuating mechanism means requiring a force for actuating said signal switch means of a lesser magnitude than that of the force required by said first actuating mechanism means to actuate said dimmer switch means whereby said signal switch means can be actuated without actuating said dimmer switch means.

8. In a lighting system for an automotive vehicle including headlights having high and low beam lighting conditions and being energizable by a source of electrical potential, the improvement comprising: dimmer switch means actuable for switching the headlights of the vehicle between high and low beam lighting conditions, electrical circuit means connecting said dimmer switch to the headlights, signal switch means actuable for connecting and disconnecting said dimmer switch means and the source, first actuating mechanism means including a member movable along a selected path actuable for actuating said dimmer switch means responsively to movement of said member along said path, and second actuating mechanism means connected to said member and actuable by a force generally along said selected path for actuating said signal switch means, said second actuating mechanism means requiring a force for actuating said signal switch means of a lesser magnitude than that of the force required by said first actuating mechanism means to actuate said dimmer switch means whereby said signal switch means can be actuated without actuating said dimmer switch means.

9. In a lighting system for an automotive vehicle including headlights having high and low beam lighting conditions and being energizable by a source of electrical potential, the improvement comprising: a dimmer switch assembly actuable for switching the headlights of the vehicle between the high and the low beam lighting conditions, said dimmer switch assembly including a first plurality of electrical contacts electrically connected between the source and the headlights and actuable for connecting the headlights to the source for the high beam lighting condition, a second plurality of electrical contacts electrically connected between the source and the headlights and actuable for connecting the headlights of the vehicle to the source for the low beam lighting condition, a movable contact member movable to a first position for engaging and actuating said first plurality of contacts and to a second position for engaging and actuating said second plurality of contacts, and actuating means including a reciprocable arm member selectively actuable for successively moving said movable contact member between said first and second positions repsonsively to reciprocation of said reciprocable arm member, a mounting plate member secured to said dimmer switch assembly for movement with said arm member, circuit means electrically connecting the headlights and the source including a signal switch member mounted on said mounting plate and actuable in one position for connecting the headlights and the source, and in another position for disconnecting the headlights and the source, a pivot plate member normally spaced from said dimmer switch assembly and movably mounted to said mounting plate for selective movement toward said dimmer switch assembly having a first portion engageable with said signal switch member for actuating said signal switch member to said one position upon movement of said pivot plate member toward said dimmer switch assembly.

10. In a lighting system for an automotive vehicle including headlights having high and low beam lighting conditions and being energizable by a source of electrical potential, the improvement comprising: a dimmer switch assembly actuable for switching the headlights of the vehicle between the high and the low beam lighting conditions, said dimmer switch assembly including a first plurality of fixed electrical contacts electrically connected between the source and the headlights and actuable for connecting the headlights to the source for the high beam lighting condition, a second plurality of fixed electrical contacts electrically connected between the source and the headlights and actuable for connecting the headlights of the vehicle to the source for the low beam lighting condition, a movable contact member movable to a first position for engaging and actuating said first plurality of fixed contacts and to a second position for engaging and actuating said second plurality of fixed contacts, and actuating means including a reciprocable arm member selectively actuable for successively moving said movable contact member between said first and second positions responsively to reciprocation of said reciprocable arm member, a cap fixed to one end of said arm member, a mounting plate member secured to said cap for movement with said arm member and extending transversely away from said cap, circuit means electrically connecting the headlights and the source including a signal switch member mounted on said mounting plate and actuable in one position for connecting the headlights and the source, and in another position for connecting the headlights and the source, a pivot plate member normally spaced from said dimmer switch assembly and hinged to said mounting plate for selective movement toward said dimmer switch assembly, and extending to a position in line with said cap and said arm member and having a first portion engageable with said signal switch member for actuating said signal switch member to said one position upon movement of said pivot plate member toward said dimmer switch assembly, means normally biasing said signal switch member to said other position and for maintaining said pivot plate member normally spaced from said dimmer switch assembly.

11. In a lighting system for an automotive vehicle including headlights having high and low beam lighting conditions, the improvement comprising: a housing member, dimmer switch means mounted in said housing member and actuable for switching the headlights of the vehicle between high and low beam lighting conditions, signal switch means actuable for turning at least one of the headlights on and off, actuating mechanism means supported in said housing member and including a member reciprocable along a selected axis and actuable for actuating said dimmer switch means responsively to reciprocation of said reciprocable member, said signal switch means including a first electrical contact fixed to said housing member and a second electrical contact fixed to said reciprocable member and engageable with said first contact responsively to movement of said reciprocable member along said axis whereby the headlights are turned on upon engagement of said first and second contacts.

12. In a lighting system for an automotive vehicle including headlights having high and low beam lighting conditions and energizable by a source of electrical potential, the improvement comprising: a housing member having a tubular portion, dimmer switch means mounted in said housing member and actuable for switching the headlights of the vehicle between high and low beam lighting conditions, signal switch means actuable for connecting and disconnecting the headlights and the source, actuating mechanism means supported in said housing member and including a member reciprocable in said tubular portion along a selected axis and actuable for actuating said dimmer switch means responsively to movement of said reciprocable member in one direction along said axis, a cap fixed to one end of said reciprocable member and covering the corresponding end of said tubular portion, said signal switch means including an electrical contact supported on said tubular portion at a position engageable by said cap upon movement of said reciprocable member in said one direction along said axis, first circuit means connecting said electrical contact to the headlights, and second circuit means including said cap and said housing member connected to the source whereby engagement of said cap and said electrical contact connects the headlights and the source.

13. In a lighting system for an automotive vehicle including headlights having high and low beam lighting conditions and energizable by a source of electrical potential, the improvement comprising: a housing member having a tubular portion, dimmer switch means mounted in said housing and actuable for switching the headlights of the vehicle between high and low beam lighting conditions, first electrical circuit means connecting said dimmer switch means to the headlights, signal switch means actuable for connecting and disconnecting said dimmer switch means to the source, first actuating mechanism means including a member reciprocable in said tubular portion along a selected axis and actuable for actuating said dimmer switch means responsively to movement of said reciprocable member in one direction along said said axis, a cap fixed to one end of said reciprocable member and covering the corresponding end of said tubular portion, said signal switch means including an electrical contact supported on said tubular portion at a position engageable by said cap upon movement of said reciprocable member in said one direction along said axis, second electrical circuit means connecting said electrical contact to the source, third electrical circuit means including said cap and said housing member connected to said dimmer switch means whereby engagement of said cap and said electrical contact connects said dimmer switch means and the source.

References Cited by the Examiner

UNITED STATES PATENTS 2,695,343  11/1954  Howard _____ 200—61.29

ROBERT K. SCHAEFER, *Primary Examiner.*

KATHLEEN H. CLAFFY, *Examiner.*

H. O. JONES, *Assistant Examiner.*